(12) United States Patent
Fritz et al.

(10) Patent No.: US 11,745,194 B2
(45) Date of Patent: Sep. 5, 2023

(54) APPLICATOR COMPRISING A SEALING MEMBRANE

(71) Applicant: Dürr Systems AG, Bietigheim-Bissingen (DE)

(72) Inventors: Hans-Georg Fritz, Ostfildern (DE); Benjamin Wöhr, Eibensbach (DE); Marcus Kleiner, Besigheim (DE); Mortiz Bubek, Ludwigsburg (DE); Timo Beyl, Besigheim (DE); Frank Herre, Oberriexingen (DE); Steffen Sotzny, Oberstenfeld (DE); Daniel Tandler, Stuttgart (DE); Tobias Berndt, Ditzingen (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 17/530,707

(22) Filed: Nov. 19, 2021

(65) Prior Publication Data
US 2022/0072570 A1    Mar. 10, 2022

Related U.S. Application Data

(63) Continuation of application No. 16/649,226, filed as application No. PCT/EP2018/055578 on Mar. 7, 2018, now Pat. No. 11,207,698.

(30) Foreign Application Priority Data

Sep. 27, 2017    (DE) ..................... 10 2017 122 488.2

(51) Int. Cl.
*B05B 1/30*        (2006.01)
*B05B 15/14*     (2018.01)
(Continued)

(52) U.S. Cl.
CPC .............. *B05B 1/3053* (2013.01); *B05B 1/20* (2013.01); *B05B 15/14* (2018.02); *B41J 2/17596* (2013.01); *F16J 15/34* (2013.01)

(58) Field of Classification Search
CPC ..... B41J 2202/05; B41J 2/17596; B05B 1/20; B05B 1/3053; B05B 15/14; B05B 15/58; F16J 15/34
See application file for complete search history.

(56) References Cited

U.S. PATENT DOCUMENTS

| 4,576,111 A | 3/1986 | Slomianny |
| 5,602,575 A | 2/1997 | Pauly |

(Continued)

FOREIGN PATENT DOCUMENTS

| CN | 102574395 A | 7/2012 |
| CN | 102666108 A | 9/2012 |

(Continued)

OTHER PUBLICATIONS

Chinese Office Action dated Mar. 29, 2021 for Application No. CN201880063176.8 (23 pages; with English machine translation).

(Continued)

*Primary Examiner* — An H Do
(74) *Attorney, Agent, or Firm* — Bejin Bieneman PLC

(57) ABSTRACT

The disclosure concerns an applicator (e.g. print head) for applying a coating agent (e.g. paint) to a component (e.g. motor vehicle body component), having a nozzle chamber with a plurality of nozzles for dispensing the coating agent in the form of continuous jets or droplets, the coating agent flowing during operation through the nozzle chamber to the nozzles so that the nozzle chamber is filled with the coating agent during operation. The print head further comprises a plurality of slidable valve needles associated with the individual nozzles and selectively opening or closing the respec- (Continued)

tive nozzle depending on the position of the valve needles. Furthermore, the print head according to the disclosure contains an actuator chamber for receiving actuators for displacing the valve needles. In addition, the applicator according to the disclosure has a sealing element which fluidically separates the actuator chamber from the nozzle chamber in order to avoid contamination of the actuator chamber with the coating agent in the nozzle chamber. The disclosure provides that the sealing element is designed such that the individual valve needles can be displaced independently of one another without a displacement of one of the valve needles impairing the opening and closing of the nozzles at the adjacent valve needle.

20 Claims, 11 Drawing Sheets

(51) Int. Cl.
    *B05B 1/20*     (2006.01)
    *F16J 15/34*     (2006.01)
    *B41J 2/175*     (2006.01)

(56) References Cited

U.S. PATENT DOCUMENTS

| | | | |
|---|---|---|---|
| 9,108,424 B2 | 8/2015 | Wallsten et al. | |
| 10,807,110 B2 | 10/2020 | Herre | |
| 11,167,297 B2 * | 11/2021 | Fritz | B05B 1/306 |
| 11,207,698 B2 * | 12/2021 | Fritz | B05B 1/20 |
| 11,511,291 B2 * | 11/2022 | Fritz | B41J 2/04 |
| 2010/0201755 A1 | 8/2010 | Mita | |
| 2013/0000758 A1 | 1/2013 | Hoen | |
| 2014/0252105 A1 | 9/2014 | Ciardella et al. | |

FOREIGN PATENT DOCUMENTS

| | | |
|---|---|---|
| CN | 202556908 U | 11/2012 |
| CN | 102883990 A | 1/2013 |
| CN | 103826858 A | 5/2014 |
| CN | 104421084 A | 3/2015 |
| CN | 104647903 A | 5/2015 |
| CN | 106256534 A | 12/2016 |
| CN | 106414081 A | 2/2017 |
| CN | 107020820 A | 8/2017 |
| DE | 2810761 A1 | 9/1978 |
| DE | 3302617 A1 | 8/1984 |
| DE | 3625067 A1 | 1/1988 |
| JP | 2003053213 A | 2/2003 |
| JP | 2010241003 A | 10/2010 |
| KR | 10 2016 0137367 A | 11/2016 |
| WO | 33004172 A1 | 1/2003 |
| WO | 2012058373 A2 | 5/2012 |
| WO | 2013013983 A1 | 1/2013 |
| WO | 2015046197 A1 | 4/2015 |
| WO | 2015186014 A1 | 12/2015 |

OTHER PUBLICATIONS

International Search Report and Written Opinion for PCT/EP2018/055578 dated Jun. 5, 2018 (21 pages; with English translation).
Office Action from the German Patent and Trademark Office for DE 10 2017 122 488.2 dated Jun. 18, 2018 (3 pages).
Chinese Office Action dated Sep. 28, 2021 for Application No. 201880063176.8 (17 pages; with English machine translation).
JPO Office Action dated Nov. 30, 2021 for related application JP2020-517789 (8 pages; with English translation).
Korean Intellectual Property Office Notice of Preliminary Rejection for related application No. KR10-2020-7011572 dated Dec. 12, 2022 (13 pages; with English translation).

* cited by examiner

Section A-A

Section B-B

Section A-A

Section B-B

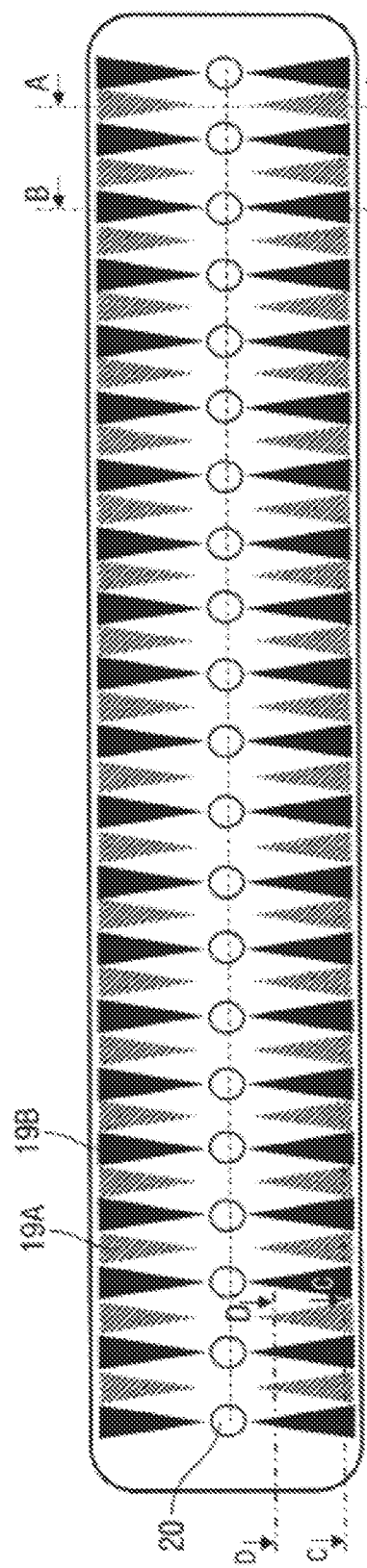
Fig. 10A
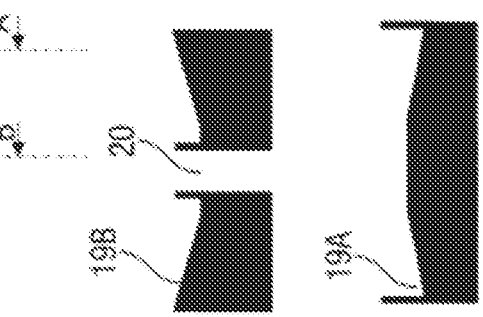
Fig. 10D Section B-B
Fig. 10E Section A-A
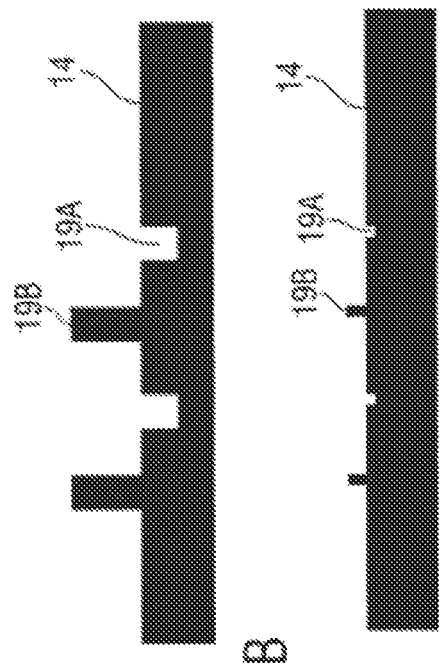
Fig. 10B Section C-C
Fig. 10C Section D-D
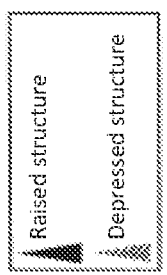

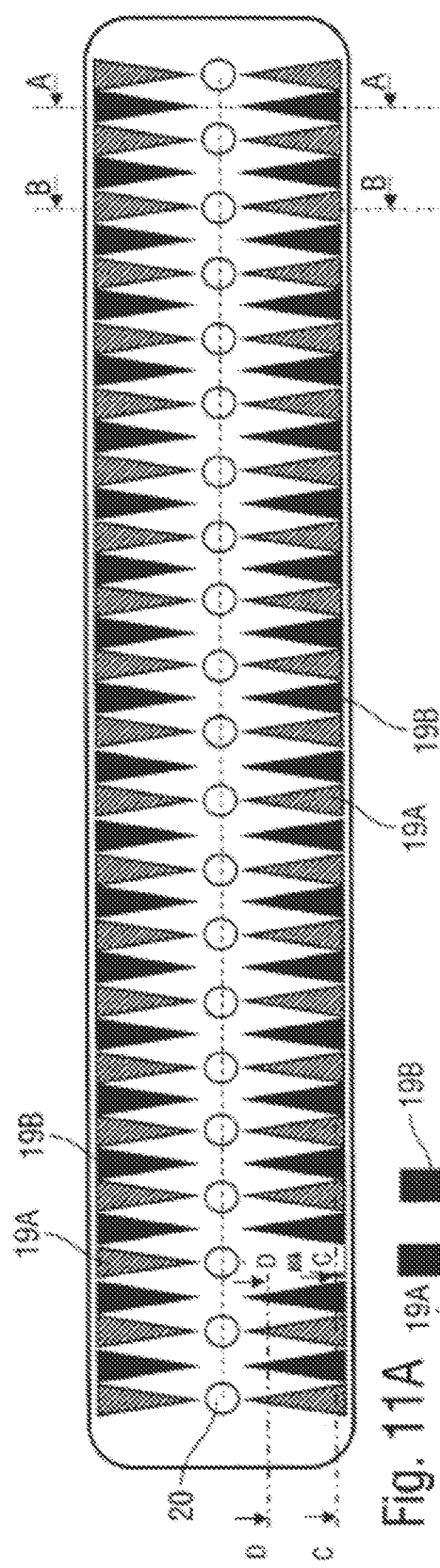
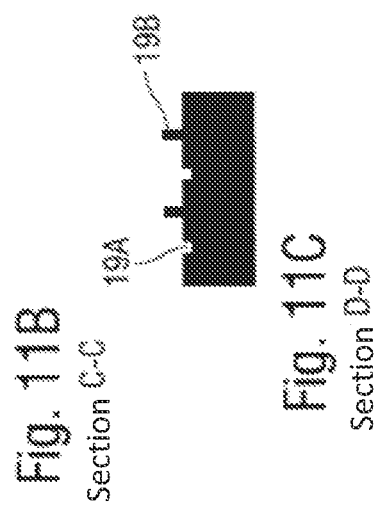
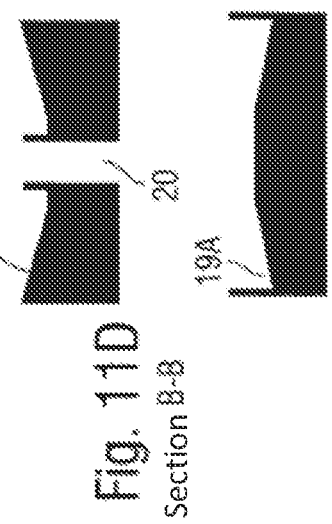
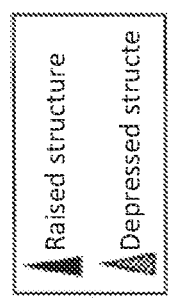

APPLICATOR COMPRISING A SEALING MEMBRANE

CROSS-REFERENCE TO RELATED APPLICATIONS

This application is a continuation of, and claims priority to, U.S. patent application Ser. No. 16/649,226, filed on Mar. 20, 2020, which is a national stage of, and claims priority to, Patent Cooperation Treaty Application No. PCT/EP2018/055578, filed on Mar. 7, 2018, which application claims priority to German Application No. DE 10 2017 122 488.2, filed on Sep. 27, 2017, which applications are hereby incorporated herein by reference in their entireties.

FIELD

The disclosure concerns an applicator (e.g. a print head) for the application of a coating agent (e.g. paint) to a component (e.g. car body component).

BACKGROUND

The state of the art (e.g. U.S. Pat. No. 9,108,424 B2) includes so-called drop-on-demand print heads, which emit a droplet jet or a continuous coating agent jet and whose operating principle is based on the use of electric valves. A magnetically driven plunger/armature is guided in a coil. If the plunger of the electromagnetic actuator and the sealing element, which closes the valve seat, is a component, it is referred to in the following as a valve plunger. Depending on the current supply to the coil, the valve plunger is shifted and a nozzle is either released or closed. Such print heads are also described in WO 2012/058373 A2. These print heads also work with valve plungers which are moved by electric coils, whereby the valve plungers run in a guide tube (coil inner tube) in the coil.

A problem with the known print heads is the fact that the actuators used to move the valve plungers are exposed to the coating agent during operation. This is initially not a problem if the coating agent is not to be changed, the coating agent is of low viscosity and no major pressures occur and the heating of the coil inner tube by the electrically energized coil does not lead to partial drying of the coating agent. However, coating agents with a higher viscosity (e.g. more than 80 mPa·s at a shear rate of 1,000 s$^{-1}$) are often used in the painting of vehicle bodies. In addition, the paintwork of vehicle bodies often involves a color change. Furthermore, the known print heads do not meet the requirements for painting vehicle bodies, as the print heads should be as free of undercutting, dead space and flow optimized as possible. As a result, the known print heads are not or not optimally suitable for the painting of vehicle bodies.

DETAILED DESCRIPTION

Figure 1A:
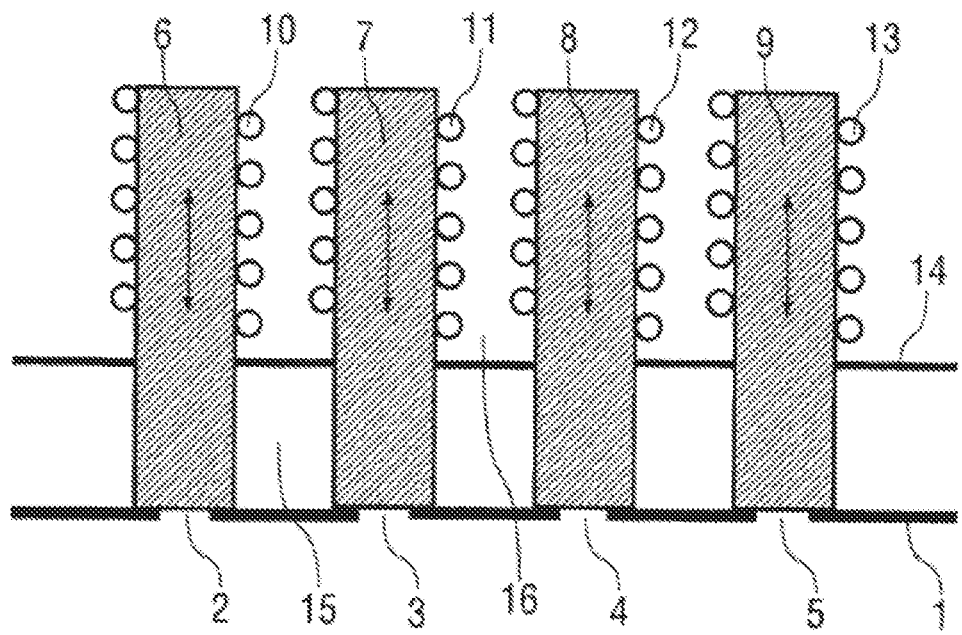
FIG. 1A shows a schematic representation of a print head according to the disclosure with all nozzles closed, FIG. 1B the schematic representation from FIG. 1A, where a single nozzle is open.

The disclosure is therefore based on the task of creating a correspondingly improved applicator.

The print head according to the disclosure is generally suitable for the application of a coating agent. The disclosure is therefore not limited to a specific coating agent with regard to the coating agent to be applied. Preferably, however, the print head is designed for the application of a paint.

It should also be noted that the print head according to the disclosure is generally suitable for applying the coating to a particular component. With regard to the type of component to be coated, the disclosure is also not limited. Preferably, however, the print head according to the disclosure is designed to apply a coating agent (e.g. paint) to a motor vehicle body component or an add-on part of a motor vehicle body component.

The print head according to the disclosure initially has a nozzle chamber with several nozzles, whereby during operation the nozzles release the coating agent in the form of a continuous jet or in the form of a droplet jet. The print head according to the disclosure thus differs from atomizers (e.g. rotary atomizers, air atomizers, etc.), which do not emit a spatially limited jet of the coating agent, but a spray of the coating agent. During operation of the print head according to the disclosure, the coating agent to be applied flows through the nozzle chamber to the nozzles, so that the nozzle chamber is filled with the coating agent during operation.

In addition, the print head according to the disclosure has preferably several displaceable plungers which are assigned to the individual nozzles and optionally open or close the respective nozzle depending on the position of the plunger.

In a variant of the disclosure, the plungers/armatures also form the valve needles and can optionally open or close a valve seat depending on their position.

In another variant of the disclosure, on the other hand, the sliding plungers/armatures are separated from the actual valve needles and only act on the valve needles mechanically connected via a so-called hammer, which then open or close a valve seat depending on their position.

In the following only valve needles are mentioned, this can be a valve needle (actuator plunger/armature connected to the valve needle via a hammer) as well as a valve plunger (actuator plunger/armature is the same component as the sealing element that closes the valve seat).

It should also be mentioned that the valve seat does not have to be located directly at the nozzle. It is also possible that the valve seat is located in front of the nozzle and connected to the nozzle via a pipe.

In addition, the print head according to the disclosure has an actuator chamber in which the actuators for moving the individual valve needles are arranged in accordance with the known print heads. For example, the actuators can be electromagnetic actuators with solenoid coils, as is the case with the known print heads described above. However, the disclosure is not limited to magnetic actuators with regard to the type of actuators, but can also be realized with other types of actuators, such as piezoelectric actuators or pneumatic actuators. Preferably, however, the actuators are electrically controllable, so that they are electromechanical actuators.

The print head according to the disclosure may additionally provide a sealing element (e.g. in the form of a continuously closed membrane or a membrane with ducts for valve needles), which fluidically separates the actuator chamber from the nozzle chamber in order to avoid contamination of the actuator chamber with the coating agent in the nozzle chamber.

In the following, the term sealing membrane is used instead of the term sealing element. However, the sealing element does not necessarily have to be a sealing membrane. The sealing membrane thus prevents the coating agent in the nozzle chamber from reaching the actuator chamber during operation and also when switched off.

In a preferred embodiment of the disclosure, the sealing membrane is continuous and separates the actuator chamber from the nozzle chamber for all or at least a large part of the nozzles. This means that an individual sealing membrane is not provided for each nozzle with the associated actuator. Rather, all nozzles with the associated actuators have a common sealing membrane which separates the common actuator chamber from the common nozzle chamber.

Preferably, the continuous sealing membrane is designed in such a way that the individual valve needles can be displaced independently of each other without a displacement of one of the valve needles impairing the opening and closing of the nozzles at the adjacent valve needle. During operation of the print head according to the disclosure, it is desirable that the individual nozzles can be opened or closed individually. However, the continuous sealing membrane can lead to a mechanical interaction between the adjacent valve needles. For example, displacement of one of the valve needles may lead to a corresponding deflection of the sealing membrane, whereby this deflection of the sealing membrane due to the elasticity of the sealing membrane would then also exert a corresponding deflection force on the adjacent valve needles, which would not be desirable. The disclosure therefore provides for this undesirable mechanical interaction between the adjacent valve needles to be reduced due to the common sealing membrane at least to such an extent that the adjacent valve needles can open or close the associated nozzles independently of each other without mutual interference.

This is preferably achieved by the fact that the common sealing membrane has a three-dimensional structure which prevents a displacement of one of the valve needles from affecting the opening and closing of the nozzles of the adjacent valve needles.

In a variant of the disclosure, this three-dimensional structure of the sealing membrane is located only on the side of the actuator chamber. In another variant of the disclosure, however, the three-dimensional structure of the sealing membrane is only on the side of the nozzle chamber. Finally, it is also possible that the three-dimensional structure of the sealing membrane is located on both sides of the sealing membrane, i.e. both on the side of the nozzle chamber and on the side of the actuator chamber.

The three-dimensional structure can have various structural elements, such as at least a cube, a cuboid, a tetrahedron, a prism, a rib, a recess or, in general, an elevation. These different types of structural elements can also be combined in the three-dimensional structure.

It should also be mentioned that the structural elements of the three-dimensional structure can be square, rectangular, triangular, parallelogram-shaped or round-arch-shaped in a top view of the sealing membrane, to name just a few examples.

In the preferred embodiment of the disclosure, the sealing membrane has at least one row of holes assigned to the individual valve needles. The row of holes is preferably straight (linear), but it is also possible that the row of holes in the sealing membrane is curved, for example arc-shaped.

With regard to the position and orientation and dimension of the individual structural elements of the three-dimensional structure in relation to the row of holes, there are various possibilities within the scope of the disclosure.

Preferably, the individual structural elements of the three-dimensional structure are each elongated and aligned with their longitudinal axis relative to the row of holes in a certain way. For example, the individual structural elements can be aligned parallel to the row of holes. Alternatively, it is also possible that the individual structural elements are aligned transversely to the row of holes, especially at right angles. It is also possible for the individual structural elements of the three-dimensional structure to be aligned obliquely with respect to the row of holes.

The disclosure also offers various possibilities with regard to the position of the individual structural elements in relation to the row of holes. For example, the individual structural elements can be arranged in at least one row parallel to the row of holes. One possibility for this is that the individual structural elements are arranged exactly in the row of holes between the adjacent holes. Alternatively, it is also possible for the individual structural elements to be laterally spaced and arranged parallel to the row of holes, in particular on both sides of the row of holes in a line with one of the holes in each case. The structural elements and the individual holes can thus be aligned in such a way that each hole is adjacent to one structural element on both sides of the row of holes.

The disclosure also offers various possibilities with regard to the dimensional relationships of the individual structural elements in relation to the row of holes.

Also with regard to the height of the individual structural elements, there are various possibilities within the scope of the disclosure. It should be mentioned here that the height of the structural elements is measured at right angles to the base area of the sealing membrane. For example, the height of the structural elements can essentially be constant within the individual structural elements. Alternatively, it is possible that the height of the individual structural elements varies within the structural elements. For example, the height of the individual structural elements can increase or decrease towards the adjacent hole. There is also the possibility that the height of the individual structural elements increases or decreases towards the row of holes, i.e. from the outside to the inside.

Within the scope of the disclosure, it is also possible that the sealing membrane around the individual holes has a annular bulge. This annular bulge is also a possible form of a structural element of the three-dimensional structure of the sealing membrane. Here, too, it is possible that the annular bulge is arranged only on the side of the actuator chamber, only on the side of the nozzle chamber or on both sides.

It should also be mentioned that the sealing membrane may have a sealing collar at the peripheral edge of each hole to seal the hole from the valve needle. The sealing collar can either protrude only towards the actuator chamber, only towards the nozzle chamber or protrude on both sides. With regard to the sealing collar, it should also be mentioned that the cross-section of the sealing collar can, for example, be triangular. The ratio of the diameter of the valve needle to the length of the sealing collar can be ≥0.5, ≥0.7, >1, ≥1.5 or even ≥2 In the case of the disclosure variant with several sealing membranes described in detail later, all sealing membranes can have such a sealing collar.

In an embodiment of the disclosure the individual valve needles are held in the holes of the sealing membrane by a press connection with a certain contact force.

In a variant of the disclosure, this contact force is dimensioned in such a way that the valve needles are axially fixed in the holes of the sealing membrane and cannot slide axially in the holes of the sealing membrane. As a result, a displacement of one of the valve needles leads to a corresponding deflection of the sealing membrane.

In another variant of the disclosure, on the other hand, this contact force is dimensioned in such a way that the valve needles can essentially slide freely axially in the holes of the sealing membrane. This means that a displacement of one of the valve needles does not lead to a corresponding deflection of the sealing membrane.

A further variant of this embodiment of the disclosure, on the other hand, provides that the valve needles in the holes of the sealing membrane can partly slide freely and are partly axially fixed. When one of the valve needles is displaced, this valve needle first takes the sealing membrane axially with it, which leads to a corresponding axial deflection of the sealing membrane. As the valve needle continues to move, the elasticity of the sealing membrane causes it to offer greater resistance, which leads to the valve needle slipping through as the valve needle moves.

It should also be mentioned that the nozzle chamber can have a relatively small volume, which can be a maximum of 100 mL, 50 mL, 10 mL, 5 mL or even a maximum of 1 mL, for example.

With regard to the holes in the sealing membrane, it should also be noted that its internal diameter is preferably smaller than the external diameter of the valve needles in order to ensure a seal. For example, the inner diameter of the holes may be 0.1 mm, 0.2 mm, 0.3 mm or 0.4 mm smaller than the outer diameter of the valve needles. However, it is also possible that the inner diameter of the holes in the sealing membrane may be 10%-50% or 20% 40% smaller than the outer diameter of the valve needles.

In addition to the sealing membrane itself, it should also be mentioned that it can be made of ceramic, metal or plastic, for example. Examples of plastics are polyethylene (PE), polypropylene (PP), polyoxymethylene (POM), thermoplastic polyurethane (PU), thermoplastic elastomer, polytetrafluorethylene (PTFE), polyketone (PK) or polyamide (PA), to name just a few examples.

It should also be mentioned that the valve needles and the holes in the sealing membrane should be aligned as precisely as possible relative to each other. There is therefore only a very small radial deviation between the centre of the holes on the one hand and the longitudinal axis of the associated valve needles, which is preferably smaller than 0.2 mm, 0.1 mm or even smaller than 0.05 mm.

It should also be mentioned with regard to the sealing membrane that it preferably consists of a material with a certain hardness, which can be in the range of 20-100 Shore-A, 50 85 Shore-A, 40 90 Shore D or 60 80 Shore-D on the Shore scale according to DIN EN ISO 868 and DIN ISO 7619-1, for example.

The sealing element (e.g. sealing membrane) can be manufactured within the scope of the disclosure by various manufacturing processes. For example, subtractive manufacturing processes such as milling, drilling or laser processing are suitable for manufacturing the sealing element (e.g. sealing membrane). Alternatively, it is possible to use additive manufacturing processes such as 3D printing, laser sintering or laser melting. Other possible manufacturing processes are injection moulding, deep drawing and vacuum melting.

In one embodiment of the disclosure, the sealing membrane has several membrane layers, which makes leakage detection possible. Between the individual membrane layers of the sealing membrane, a leakage bore preferably opens out of the print head in order to detect a leakage when one of the membrane layers has become permeable. The second membrane layer then provides additional security. For example, the leakage bore can be connected to a sensor which then detects the leakage due to a coating agent escaping from the leakage bore. Alternatively, it is also possible for the leakage bore to lead into a sight glass or a transparent hose in order to detect a leakage optically. The leakage bore can then also lead into a dirt diluent disposal or into a collecting tray or into a collecting groove.

In one embodiment of the disclosure, the sealing membrane has no holes for the valve needles to pass through. This is advantageous because the holes can otherwise cause sealing problems. With this design of the sealing membrane without holes, the sealing membrane can have a shaped nozzle closure tip on the nozzle side to open or close the respective nozzle or the upstream valve seat depending on the deflection of the sealing membrane. The sealing membrane thus not only fulfils the function of a seal, but also forms the nozzle closure tip. The individual valve needles can each be firmly connected to the sealing membrane, so that a displacement of one of the valve needles leads to a corresponding deflection of the sealing membrane with the nozzle closure tip formed on it.

In a different embodiment of the disclosure, however, the sealing membrane has a hole for each individual valve needle. The individual valve needles can be passed through the corresponding hole in the sealing membrane, whereby the individual valve needles are firmly and fluid-tightly connected to the sealing membrane. On the one hand, the individual holes in the sealing membrane are sealed against the valve needles to prevent the passage of liquid through the holes. On the other hand, the connection between the valve needles and the sealing membrane may also cause a displacement of the individual valve needles to lead to a corresponding deflection of the sealing membrane.

In a different embodiment of the disclosure, on the other hand, a nozzle closure tip is inserted in each of the individual holes of the sealing membrane on the side of the nozzle chamber, which optionally opens or closes the associated nozzle depending on the deflection of the sealing membrane. The valve needles, on the other hand, are firmly connected to the sealing membrane in the area of the holes, in particular by a screw connection between the valve needles on the one hand and the nozzle closure tip on the other, which are arranged on opposite sides of the sealing membrane.

In one embodiment of the disclosure, the valve needles each have a valve needle tip that tapers conically towards its free end.

In addition, the disclosure allows the individual valve needle tips to each have a separate sealing element.

For example, the separate sealing element can be glued onto the valve needle tip. Alternatively, it is also possible for the valve needle tip to have a socket in which the valve needle tip is inserted. Alternatively, it is also possible for the valve needle tip to be enclosed by the separate sealing element over part of its length.

It should also be mentioned that the valve needle and the sealing element can be made of different materials, in particular metal for the valve needle and plastic for the sealing element.

The sealing element can be attached to the tip of the valve needle by injection moulding, dipping, welding or vulcanising, to name just a few examples.

It has already been briefly mentioned above that the sealing membrane can have several membrane layers, which makes leakage detection possible. Alternatively, however, it is also possible that not a single sealing membrane with several membrane layers is used, but several separate membranes which enclose a fluid space between them. One membrane is arranged on the nozzle side and encloses the nozzle chamber, which is filled with the coating agent to be applied during operation. The other membrane, on the other hand, is arranged on the actuator side so that the two membranes enclose a fluid space between each other. This also enables leakage detection and has further design advantages, as explained in detail below.

The applicator according to the disclosure preferably has a coating agent inlet in order to feed the coating agent to be applied into the nozzle chamber of the applicator. In addition, the applicator according to the disclosure preferably has a coating agent outlet in order to discharge non-applied coating agent from the nozzle chamber, for example within the scope of a material circulation. Furthermore, the applicator according to the disclosure preferably has a barrier fluid inlet in order to introduce a barrier fluid into the fluid space between the two membranes. Finally, the applicator according to the disclosure preferably also has a barrier fluid outlet to discharge the barrier fluid from the fluid space between the two membranes, for example within the framework of a material circulation.

In addition, the disclosure also claims protection for an application system with the above described applicator according to the disclosure and other parts or components.

Thus, the application system according to the disclosure preferably comprises a source of coating agent which feeds the coating agent into the coating agent inlet of the applicator. The coating source may include, for example, a coating tank, pump and valves.

In addition, the application system according to the disclosure preferably also includes a barrier fluid source which feeds the barrier fluid into the barrier fluid inlet of the applicator. The barrier fluid source may include, for example, a fluid reservoir, pump and valves.

A throttle may be connected to the barrier fluid outlet of the invented applicator to affect the pressure of the barrier fluid in the fluid space.

In addition, a controllable coating agent valve may be connected to the coating outlet of the invented applicator. For example, the coating agent valve can direct the coating agent exiting the applicator to a waste container for disposal or to a circulation container for reuse.

In addition, a controllable barrier fluid valve may be connected to the barrier fluid outlet of the invented applicator. The barrier fluid valve can direct the escaping barrier fluid, for example, to a waste container for disposal or to the barrier fluid source for reuse.

The barrier fluid may be a liquid such as a water-based detergent, an organic detergent or a solvent mixture. Alternatively, the barrier fluid may be a gas, such as compressed air. Other variants, on the other hand, provide that the barrier fluid is a paint component of the paint to be applied or a paint compatible medium, such as (C10-C21)alkanesulfonic acid phenyl ester (Mesamoll®).

The application system according to the disclosure preferably also has a control device which controls the filling of the fluid chamber and/or the nozzle chamber with the barrier fluid or with the coating agent to be applied.

For example, the control device can fill the fluid chamber with the barrier fluid in a time-controlled manner, for example hourly, daily, weekly or monthly.

Alternatively, it is possible for the control unit to fill the fluid chamber once with the barrier fluid before the start of the application.

Alternatively, it is also possible for the barrier fluid to flow permanently through the fluid chamber.

During operation of the application system according to the disclosure, it is preferably intended that the barrier fluid source fills the fluid space of the applicator with a certain pressure of the barrier fluid.

For example, the pressure of the barrier fluid in the fluid space can be open-loop-controlled, i.e. without a feedback loop.

Alternatively, it is also possible to control the pressure of the barrier fluid in the fluid space using a control loop, i.e. a feedback loop. For example, the coating agent pressure in the nozzle chamber or the barrier fluid pressure in the fluid chamber can be measured by a pressure sensor and the pressure can then be controlled by a pressure regulator at the coating agent inlet and/or outlet.

In an alternative to the disclosure, the predetermined pressure of the barrier fluid in the fluid chamber is greater than the coating agent pressure in the nozzle chamber, in particular by 0.5 bar, 1 bar, 2 bar or 3 bar higher. The result of this pressure difference is that the pressure difference on both membrane sides pushes the membrane on the nozzle side in the direction of the nozzles, so that this membrane biases the valve needles in the direction of a closed position.

Another alternative, however, provides that the predetermined pressure of the barrier fluid in the fluid chamber is less than the coating agent pressure in the nozzle chamber, especially by 0.5 bar, 1 bar, 2 bar or 3 bar. The membrane on the nozzle side is thus deflected in the direction of the actuators by the pressure difference between the two membrane sides, so that this membrane biases the corresponding valve needles into an open position.

In another alternative, however, it is provided that the predetermined pressure of the barrier fluid in the fluid space is essentially equal to the coating agent pressure in the nozzle chamber. In this alternative, the pressure of the barrier fluid in the fluid space thus compensates the coating agent pressure in the nozzle chamber, so that the actuators do not have to overcome any pressure-related force, but only the inherent elasticity of the membrane.

Furthermore, the application system can have an expansion vessel, an expansion membrane or a piston cylinder to influence the pressure of the barrier fluid in the fluid space of the applicator.

It has already been mentioned above that the multiple membranes allow leakage detection. The application system according to the disclosure therefore preferably includes a pressure sensor which enables the pressure of the barrier fluid in the fluid space to be measured in order to allow leakage detection.

It has also been briefly mentioned above that the pressure of the barrier fluid in the fluid space exerts a counterforce on the nozzle side membrane to compensate, amplify or overcompensate for the pressure of the coating agent on this membrane. It should be noted that the valve needles are preferably fixed or at least frictionally connected to the sealing membrane, so that a displacement of the valve needles results in a corresponding deflection of the sealing membrane, while a deflection of the sealing membrane results in a corresponding deflection of the valve needles. The sealing membrane and the valve needles take each other with them. The coating agent pressure in the nozzle chamber presses from one side against the sealing membrane and thus generates a corresponding opening force on the valve needles, which pushes the valve needles into an open position. The barrier fluid pressure in the fluid chamber, on the other hand, presses in the opposite direction on the sealing membrane and thus generates a closing force which acts on the valve needles. For example, the closing force can be higher or lower and also substantially equal to the opening force.

Finally, the disclosure also includes the idea of introducing a shock of compressed air into the nozzle chamber. A compressed air source can be provided for this purpose, which introduces the compressed air shock into the nozzle chamber, especially after assembly of the application system and before filling the applicator with the coating agent to be applied. This idea has its own importance worthy of protection and therefore enjoys protection independently of the other aspects of the disclosure, i.e. even without the features of the main claim.

Furthermore, the disclosure also includes a corresponding operating procedure for the disclosure-appropriate applicator or the disclosure-appropriate application system. The individual process steps of the operating procedure conforming to the disclosure are described in the above description of the applicator or application system conforming to the disclosure, so that reference is made to the above description to avoid repetitions.

Figure 1B:
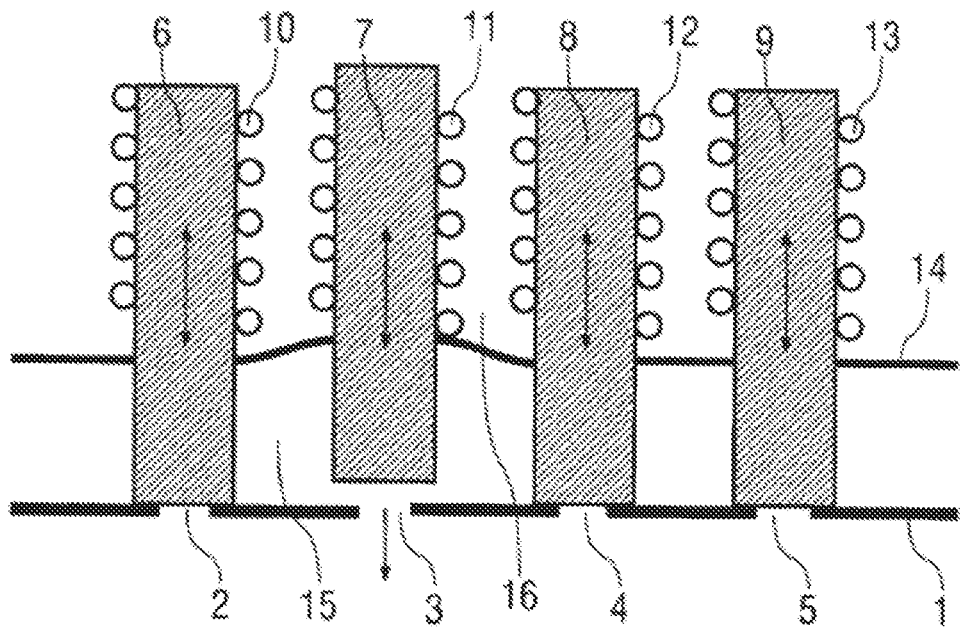

FIGS. 1A and 1B show various schematic representations of a print head according to the disclosure that can be used in a paint shop to apply paint to vehicle body components. In some respects, the design and function of the print head according to the disclosure corresponds to the known print heads described above, so that only the details essential to the disclosure are described in more detail below.

The print head according to the disclosure initially has a nozzle plate 1 with numerous nozzles 2-5, whereby a spatially narrowly limited jet of coating agent can be emitted through each of the nozzles 2-5. Only the four nozzles 2-5 are shown in this schematic representation. In fact, however, the print head according to the disclosure has a considerably larger number of nozzles, which can be arranged in rows and columns, for example, which is not apparent from this schematic representation.

The individual nozzles 2-5 are each assigned a valve needle 6-9, whereby the individual valve needles 6-9 are each movable in the direction of the double arrow.

To move the individual valve needles 6-9, several electromagnetic actuators 10-13 are provided, which here are only schematically drawn as a coil.

The valve needles 6-9 can optionally close or release the nozzles 2-5 depending on their position. In the representation shown in FIG. 1A, all nozzles 2-5 are closed by the corresponding valve needles 6-9 so that no paint is released. In the representation shown in FIG. 1B, however, the valve needle 7 is lifted from nozzle 3 so that a spray of paint or a drop is emitted through nozzle 3, as indicated by the arrow. In the FIG. 1B the other nozzles 2, 4, 5 are closed by the corresponding needles 6, 8 or 9.

In addition, the print head according to the disclosure has a continuous sealing membrane 14, which fluidically separates a nozzle chamber 15 from an actuator chamber 16 in the print head. The coating to be applied is led via the nozzle chamber 15 to the individual nozzles 2-5, i.e. the nozzle chamber 15 is filled with the coating to be applied during operation.

In the actuator chamber 16, on the other hand, there are the actuators 10-13 or only the valve needles. The sealing membrane 14 prevents paint from the nozzle chamber 15 from penetrating into the actuator chamber 16. This is advantageous because the heating of the actuators 10-13 does not affect the paint at all or only to a negligible extent, thus preventing heat-induced paint buildup in the nozzle chamber 15 and in the actuator chamber 16. In addition, the separation by the sealing membrane allows 14 colour changes, since the actuator chamber 16 does not have to be rinsed.

It should be mentioned here that the individual valve needles 6-9 can each be passed through holes in the sealing membrane 14, whereby the sealing membrane 14 can be firmly connected to the individual valve needles 6-9. As a result, for example, the displacement of the valve needle 7 in FIG. 1B leads to a corresponding local deflection of the sealing membrane 14. This local deflection of the sealing membrane in the area of the valve needle 7 also leads to corresponding forces on the adjacent valve needles 6 and 8 due to the elasticity of the sealing membrane 14. However, the sealing membrane 14 is designed in such a way that an undesired interaction between the adjacent valve needles 6 on the one hand and 8 on the other hand is prevented. This is important so that the individual valve needles 6-9 can be opened and closed independently of each other. The sealing membrane 14 therefore has a three-dimensional structure that prevents the deflection of the sealing membrane from leading to mechanical crosstalk with the adjacent valve needles 6 or 8. This three-dimensional structure will be described in detail later.

Figure 2:
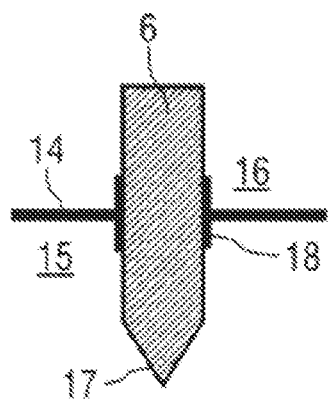
FIG. 2 shows a schematic representation of the sealing membrane of a print head according to the disclosure with a hole for a valve needle.
Figure 3:
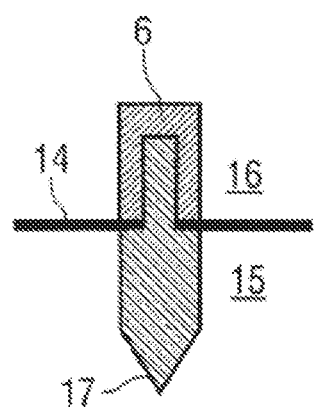
FIG. 3 is a variation of FIG. 2, where the valve needle and nozzle closure tip are separated and screwed together.
Figure 4:
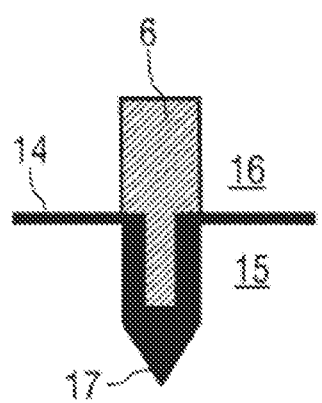
FIG. 4 is a variation of FIG. 3, wherein the nozzle closure tip is formed on the sealing membrane, FIG. 5 a schematic representation of a sealing membrane of a print head according to the disclosure with knobs as three-dimensional structure.

FIGS. 2-4 show various possible designs for the passage, connection or placement of the valve needles 6-9 through the sealing membrane 14, whereby the drawings only show the valve needle 6.

In FIG. 2, the valve needle 6 is continuous and thus forms a sealing element at the same time with its nozzle closure tip 17 for closing or releasing a corresponding valve seat.

In addition, it can be seen from the drawing that a sealing collar 18 is integrally formed on the sealing membrane 14, which protrudes from the sealing membrane 14 both towards the actuator chamber 16 and towards the nozzle chamber 15.

In the design as shown in FIG. 3, the nozzle closure tip 17 is separated from the valve needle 6 and screwed to the valve needle 6. The sealing membrane 14 is pressed between the valve needle 6 and the nozzle closure tip 17 so that the valve needle 6 is firmly connected to the sealing membrane 14. A displacement of the valve needle 6 thus leads to a corresponding deflection of the sealing membrane 14.

In the design shown in FIG. 4, the sealing membrane 14 does not have a hole for the valve needle 6 to pass through. Rather, the nozzle closure tip 17 is integrally formed onto the sealing membrane 14. Here, too, the valve needle 6 is firmly connected to the sealing membrane 14, so that a displacement of the valve needle 6 leads to a corresponding deflection of the sealing membrane 14.

Figure 5:
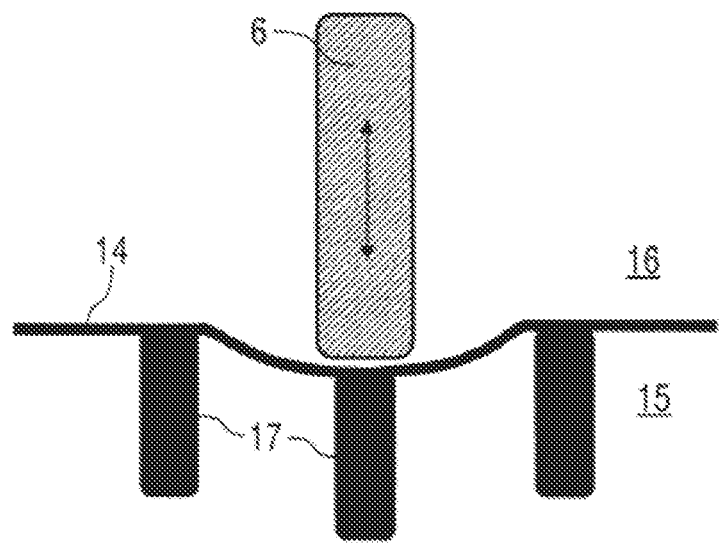

FIG. 5 shows a sealing membrane 14 with integrally formed nozzle closure tips. The valve needle 6 can be connected to the sealing membrane 14, but it can also only be fitted. In the case of a valve needle 6 only attached, the opening of the nozzle is caused by the paint pressure. The paint pressure deforms the sealing membrane 14 in the direction of the actuator chamber 16 away from the nozzle chamber 15.

Figure 6:
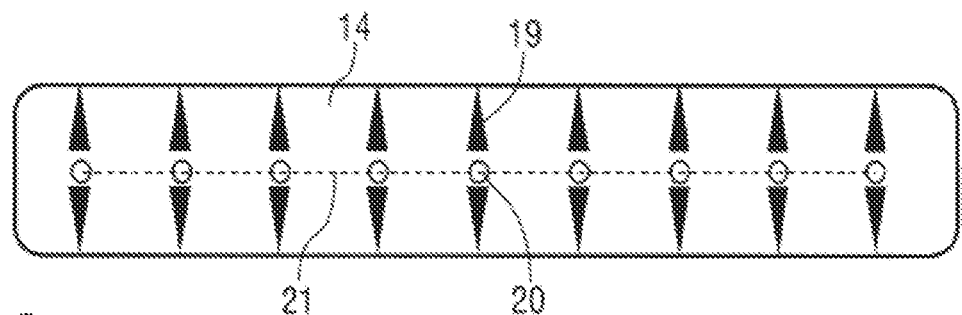
FIG. 6 shows a schematic view of a sealing membrane with a three-dimensional structure.

FIG. 6 shows a schematic representation of a sealing membrane 14 in conformity with the disclosure, which partly corresponds to the embodiments described above, so that reference is made to the above description to avoid repetition, using the same reference signs for corresponding details.

It should be noted that numerous holes 20 are arranged equidistantly in a single linear row of holes 21 in the sealing membrane 14. The holes 20 in the sealing membrane 14 are used to pass through the valve needles 6-9 or the other valve needles not shown in the previous drawings, as described above.

As a result of the structural elements 19, a local deflection of the sealing membrane 14 due to a corresponding displacement of the associated valve needle 6 remains locally limited and does not mechanically transfer to the adjacent valve needle 7.

The structural elements 19 of the three-dimensional structure of the sealing membrane 14 are triangular in a view of the sealing membrane 14. It should also be mentioned that one row of the triangular structural elements 19 is arranged on each side of the row of holes 21. Thus one of the triangular structural elements 19 is arranged on each side of the individual holes 20. It should also be mentioned here that the individual structural elements 19 taper from the inside to the outside, as can also be seen from the drawing.

The height of the individual structural elements 19 can be constant or increase or decrease from the inside to the outside.

Figure 7:
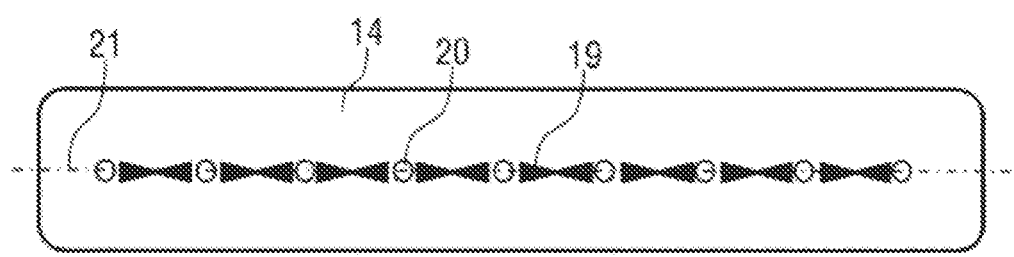
FIG. 7 is a variation of FIG. 6, FIG. 8A a variation of FIG. 6.

FIG. 7 shows a modification of FIG. 6, so that to avoid repetitions the above description is referred to, for which the same reference signs are used for corresponding details.

A feature of this embodiment is that the triangular structural elements 19 are arranged between the adjacent holes 20 of the sealing membrane 14. The holes 20 and the structural elements 19 are all located within the row of holes 21.

It should also be mentioned that the individual structural elements 19 are aligned with their longitudinal axis parallel to the row of holes 21.

Figure 8A:
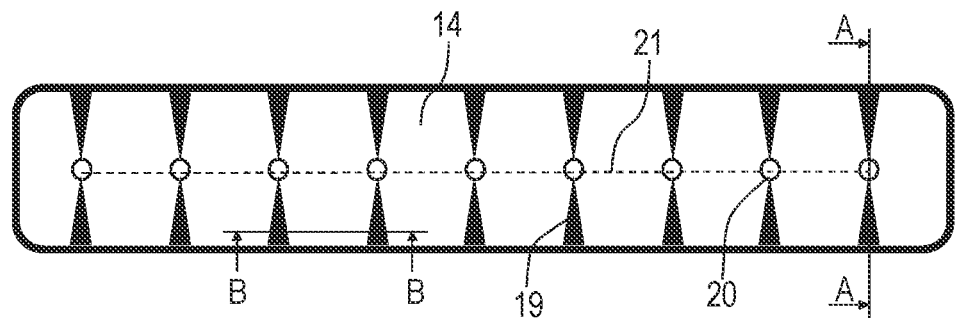
FIG. 8B shows a section along the section line A-A in FIG. 8A, FIG. 8C a section view along the section line B-B in FIG. 8A.
Figure 8B:
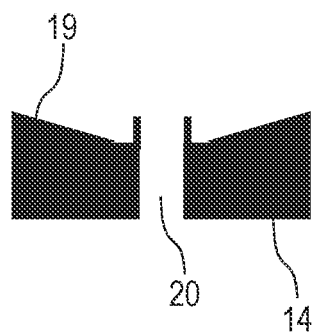
Figure 8C:
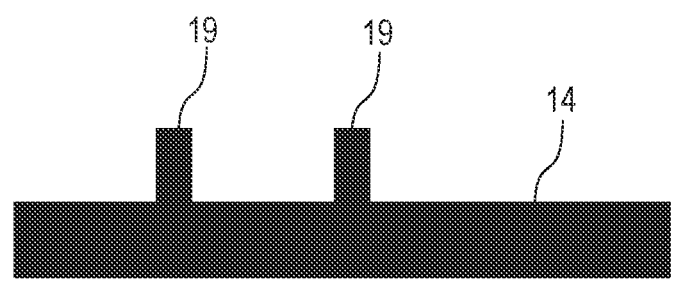

FIGS. 8A, 8C show a variation of the example shown in FIG. 6, so that to avoid repetition, reference is made to the above description, using the same reference marks for appropriate details.

A feature of this example is that the triangular structural elements 19 extend from the inside to the outside.

Another feature of this example is that the height of the triangular structural elements 19 increases from the inside to the outside, as can be seen in FIG. 8B.

Figure 9A:
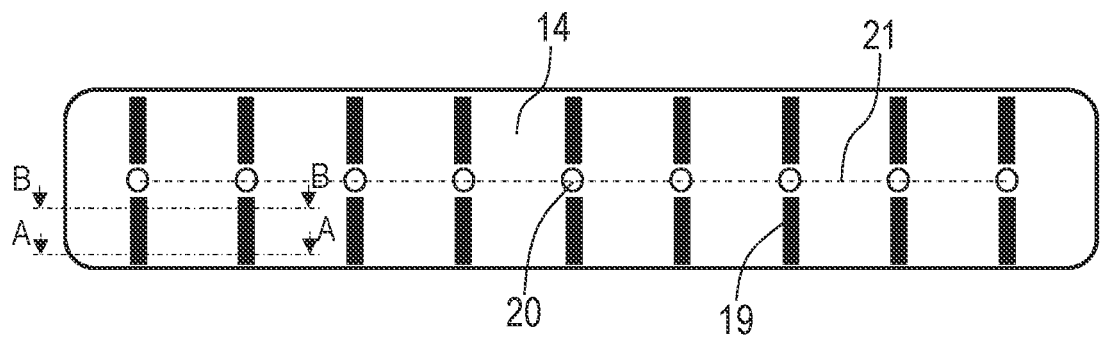
FIG. 9A is a variation of FIG. 6, FIG. 9B a section view along the section line A-A in FIG. 9A, FIG. 9C a section view along the section line B-B in FIG. 9A, FIG. 10A a variation of FIG. 6, FIG. 10B a section view along the section line C-C in FIG. 10A, FIG. 10C a section view along the section line D-D in FIG. 10A, FIG. 10D a section view along the section line A-A in FIG. 10A, FIG. 10E a section view along the section line B-B in FIG. 10A, FIG. 11A a variation of FIG. 10A, FIG. 11B a section view along the section line C-C in FIG. 11A, FIG. 11C a section view along the section line D-D in FIG. 11A, FIG. 11D a section view along the section line A-A in FIG. 11A, FIG. 11E a section view along the section line B-B in FIG. 11A, FIG. 12 an enlarged view of a section of FIG. 11A with dimensions to explain the proportions, FIG. 13 a schematic representation of a sealing membrane with a sealing collar, FIG. 14 a variation of FIG. 13, FIG. 15 a variation of FIG. 13, FIG. 16 a variation of FIG. 13.
Figure 9B:
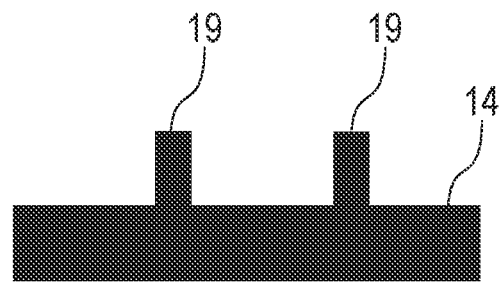
Figure 9C:
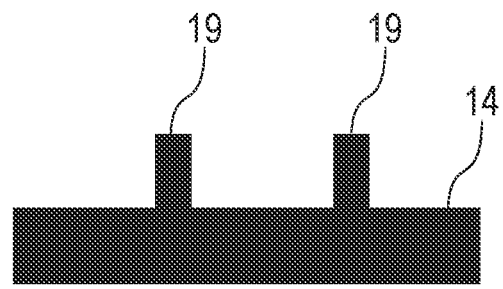

FIGS. 9A, 9C show a further variation, which is also largely consistent with the embodiments described above, so that reference is made to the above description to avoid repetitions, using the same reference signs for corresponding details.

A feature of this example is that the three dimensional structural elements 19 are shaped as ribs.

It should also be mentioned that the three-dimensional structural elements 19 formed as ribs can have a constant height, as can be seen from the comparison of FIGS. 9B and 9C. However, they may also have an outwardly rising or falling height.

FIGS. 10A, 10E show a further variation, which in turn is largely consistent with the above examples of execution, so that to avoid repetition, reference is made again to the above description, using the same reference signs for the corresponding details.

A feature of this embodiment is that the three-dimensional structure of the sealing membrane comprises 14 different types of structural elements 19A, 19B. The structural elements 19A are recessions, while the structural elements 19B are elevations.

However, the two structural elements 19A and 19B are also triangular and taper in the sealing membrane 14 inwards towards the longitudinal axis of row of holes 21.

It should also be mentioned that the height of the structural elements 19B decreases from the outside to the inside. Similarly, the depth of structural elements 19A increases from the inside to the outside, as shown in FIG. 10E and FIG. 10D.

FIGS. 11A-11E show a variation of the design according to FIGS. 10A, 10E, so that in order to avoid repetitions, reference is made again to the above description, using the same reference signs for corresponding details.

A feature of this example is that the structural elements 19A, which are realized as recesses, are arranged on both sides of the holes 20, whereas the structural elements 19B, which are realized as elevations, are arranged between two adjacent holes 20 of the row of holes 21.

Figure 12:
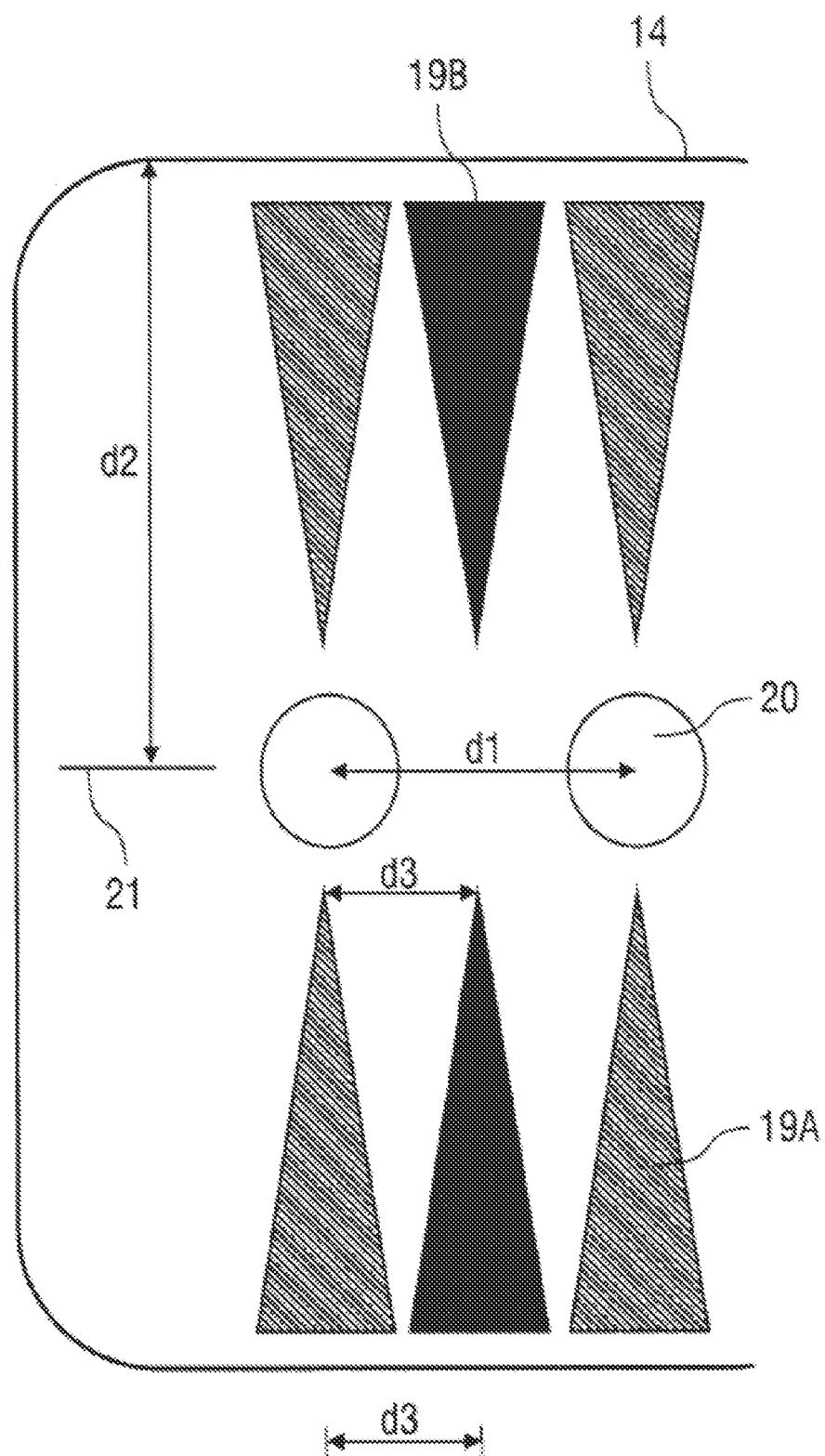

FIG. 12 shows a detail enlargement from FIG. 11A. The drawing shows a distance d1 between the adjacent holes. In addition, the drawing shows a distance d2 between the row of holes 21 and the edge of the sealing membrane 14. Furthermore, the drawing shows a distance d3 between the adjacent structural elements 19A, 19B.

Preferably, the following dimensional ratios may apply:
d1/d3≥1;2;3;4 Essentially=1;2;3;4
d2/d1≥1;3;5;10

Figure 13:
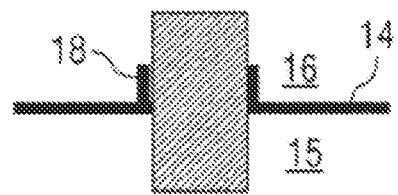
Figure 16:
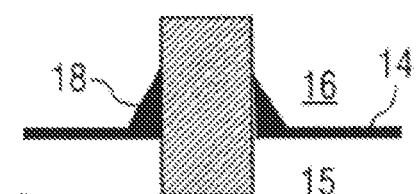

Finally, FIGS. 13 and 16 show 16 different possible designs of the sealing force 18.

In FIG. 13, the sealing collar 18 protrudes only in one direction from the sealing membrane 14, namely towards the actuator chamber 16.

Figure 14:
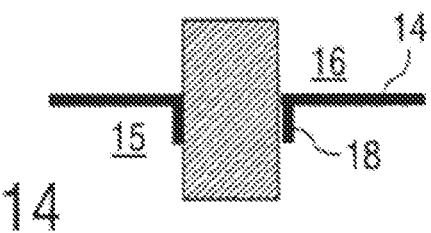

In the design according to FIG. 14, the sealing collar 18 also only protrudes in one direction from the sealing membrane 14, i.e. in the direction of the nozzle chamber 15.

Figure 15:
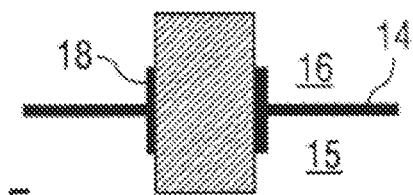

In the design according to FIG. 15, the sealing collar 18, on the other hand, protrudes from the sealing membrane 14 in both directions.

Finally, FIG. 16 shows a sealing collar 18 with a triangular cross-section. This can point both in the direction of the actuator chamber 16 and in the nozzle chamber 15.

Figure 17:
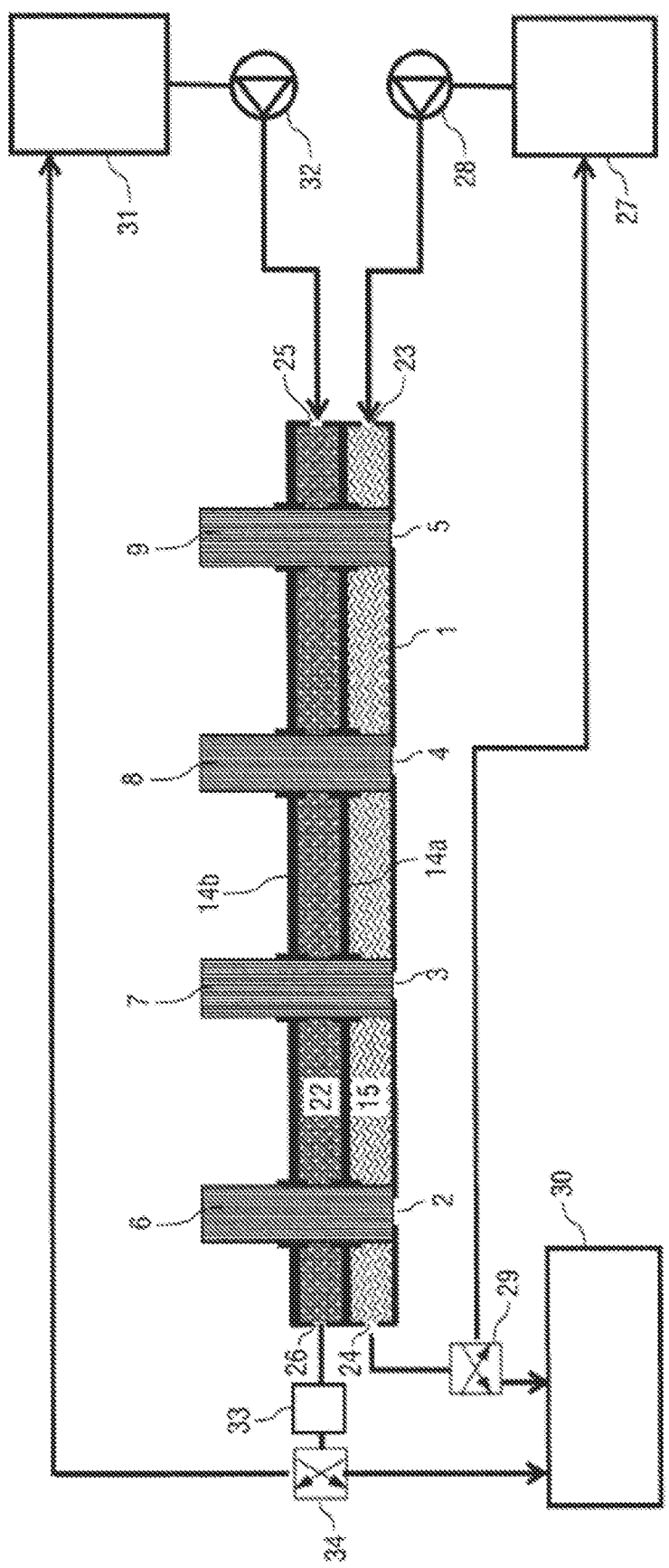
FIG. 17 shows a schematic representation of an application system conforming to the disclosure with an applicator conforming to the disclosure with two membranes, FIG. 18A a schematic representation of the applicator with the two membranes, and FIG. 18B a variation of FIG. 18A with different pressure ratios.

FIG. 17 shows an application system according to the disclosure with an application head according to the disclosure, which partly corresponds to the above described embodiments. In order to avoid repetitions, reference is therefore made to the above description, where the same reference signs are used for the corresponding details.

A feature of the applicator in this embodiment is that two sealing membranes 14a and 14b are provided.

The sealing membrane 14a is arranged on the nozzle side and essentially corresponds to the sealing membrane 14 in the previous examples. The sealing membrane 14a thus encloses the nozzle chamber 15.

In contrast, the second sealing membrane 14b is arranged on the actuator side and encloses a fluid space 22 together with the nozzle-side sealing membrane 14a.

To introduce the paint to be applied into the applicator, the applicator has a coating agent inlet 23.

In addition, the applicator has a coating agent outlet 24, whereby unapplied coating agent can be discharged from the applicator, for example in the course of material circulation.

Furthermore, the applicator has a barrier fluid inlet 25 for introducing a barrier fluid (e.g. compressed air, water-based rinsing agent, organic solvent) into the fluid space 22.

The barrier fluid can then exit the applicator through a barrier fluid outlet 26.

The paint to be applied is taken from a paint container 27 and fed into the coating agent inlet 23 of the applicator by means of a pump 28. The supplied paint then leaves the applicator either via the nozzles 2-5 or within the framework of a material circulation through the coating agent outlet 24.

A controllable valve 29 is connected to the coating agent outlet 24, whereby the valve 29 directs the emerging coating agent either into a waste container 30 or back into the paint container 27 within the scope of a material circulation.

The barrier fluid is taken from a barrier fluid source 31 and fed via a pump 32 into the barrier fluid inlet 25 of the applicator.

The barrier fluid then leaves the applicator via the barrier fluid outlet 26 to a pressure sensor 33, which measures the barrier fluid pressure in the fluid space 22 and thereby enables leakage detection.

The escaping barrier fluid is then directed by a controllable valve 34 either into the waste container 30 or back to the barrier fluid source 31 within the framework of a material circulation.

Figure 18A:
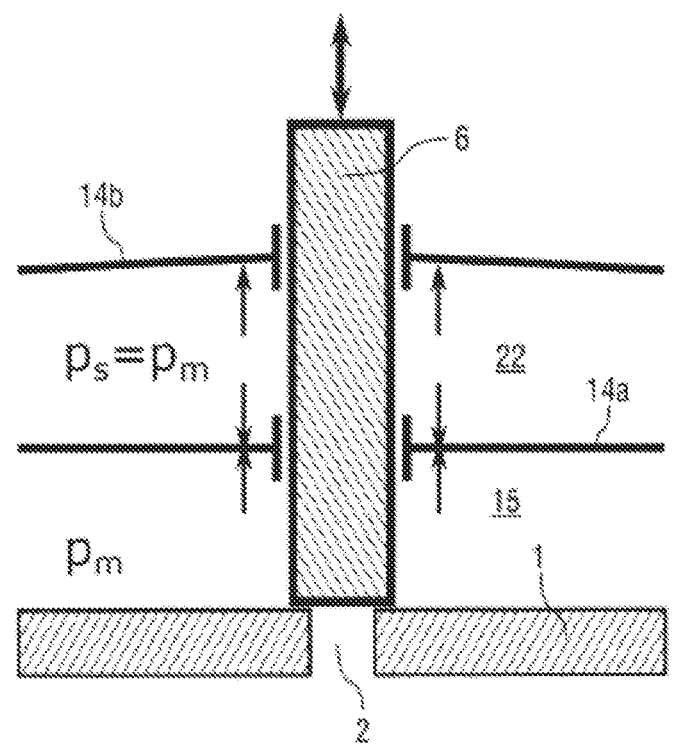
Figure 18B:
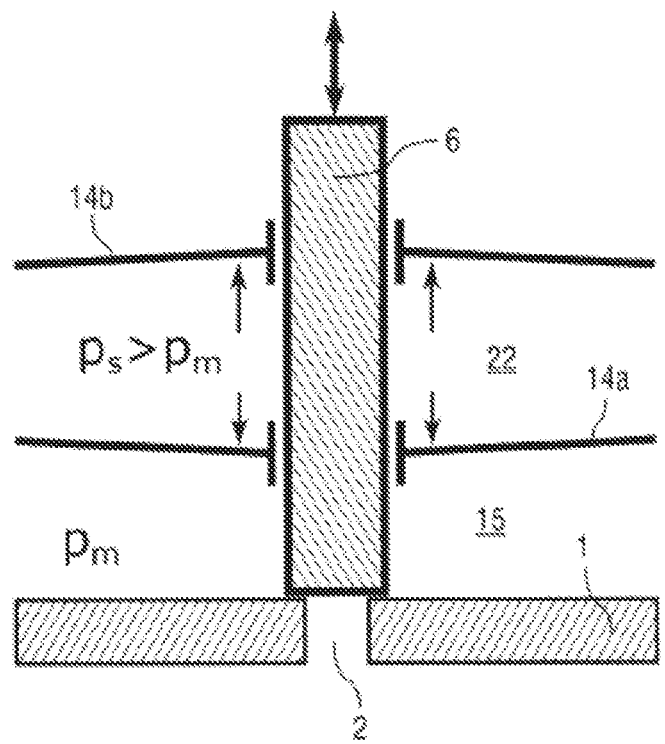

FIGS. 18A and 18B show different pressure ratios in the nozzle chamber 15 on one side and in the fluid space 22 on the other side.

Thus the barrier fluid pressure $p_s$ in the fluid space 22 in FIG. 18A is equal to the coating agent pressure $p_m$ in the nozzle chamber 15. This means that the barrier fluid pressure $p_s$ in the fluid space 22 compensates the coating agent pressure $p_m$ in the nozzle chamber 15, so that no pressure-related forces act on the sealing membrane 14a.

In the condition shown in FIG. 18B, the barrier fluid pressure $p_s$ in the fluid space 22 is greater than the coating agent pressure $p_m$ in the nozzle chamber 15. As a result, the pressure difference exerts a deflection force on the sealing membrane 14a, which in turn biases the valve needle 6 into a closed position, i.e. downwards in the drawing.

The disclosure is not limited to the preferred embodiments described above. Rather, a large number of variations and modifications are possible which also make use of the disclosure idea and therefore fall within the scope of protection.

The invention claimed is:

1. A system for applying a coating agent to a component, said system comprising:
    an applicator including a nozzle chamber having a plurality of nozzles for dispensing the coating agent in the form of continuous jets or droplets, the coating agent flowing in use through the nozzle chamber to the nozzles so that the nozzle chamber is filled with the coating agent in use;
    a coating agent inlet for supplying the coating agent to be applied into the nozzle chamber of the applicator;
    a coating agent source which feeds the coating agent into the coating agent inlet of the applicator;
    a plurality of displaceable valve needles which are assigned to the individual nozzles and selectively open or close the respective nozzle as a function of the position of the valve needle;
    an actuator chamber for accommodating actuators for displacing the valve needles; and
    a sealing element, which fluidically separates the actuator chamber from the nozzle chamber in order to avoid contamination of the actuator chamber with the coating agent in the nozzle chamber, the sealing element designed such that the individual valve needles can be displaced independently of one another without a displacement of one of the valve needles affecting the opening and closing of the nozzles at the adjacent valve needle.

2. The system according to claim 1, wherein the sealing element between the nozzle chamber and the actuator chamber comprises at least two membranes enclosing a fluid space between them.

3. The system according to claim 2, further comprising a barrier fluid inlet for supplying a barrier fluid into the fluid space between the two membranes.

4. The system according to claim 3, further comprising a barrier fluid source which feeds the barrier fluid into the barrier fluid inlet of the applicator.

5. The system according to claim 4, wherein the barrier fluid source fills the fluid space of the applicator with a specific pressure of the barrier fluid.

6. The system according to claim 4, further comprising a barrier fluid outlet for returning the barrier fluid from the fluid space of the applicator to a barrier fluid return.

7. The system according to claim 6, further comprising a throttle at the barrier fluid outlet for influencing the pressure in the fluid space.

8. The system according to claim 6, further comprising a barrier fluid valve at the barrier fluid outlet, the barrier fluid valve directing the unapplied barrier fluid from the applicator selectively to a waste container for disposal or to the barrier fluid source for reuse.

9. The system according to claim 3, wherein the barrier fluid is one of the following fluids:
a) a liquid,
b) a gas,
c) one component of the paint to be applied,
d) a paint compatible medium.

10. The system according to claim 3, wherein
a) a control device is provided for controlling the filling of the fluid space of the applicator with the barrier fluid, and
b) the control device fills the fluid space once with the barrier fluid in each case before the start of application, and
c) the control device fills the fluid space in a time-controlled manner.

11. The system according to claim 3, wherein the pressure of the barrier fluid in the fluid space is adjusted in an open-loop-controlled manner without a feedback loop.

12. The system according to claim 3, wherein the pressure of the barrier fluid is controlled by a control circuit.

13. The system according to claim 3, wherein the predetermined pressure of the barrier fluid in the fluid space is greater than the coating agent pressure in the nozzle chamber.

14. The system according to claim 3, wherein the predetermined pressure of the barrier fluid in the fluid space is smaller than the coating agent pressure in the nozzle chamber.

15. The system according to claim 3, wherein the predetermined pressure of the barrier fluid in the fluid space is substantially equal to the coating agent pressure in the nozzle chamber.

16. The system according to claim 3, further comprising:
a) an expansion vessel, an expansion membrane or a piston cylinder for adjusting the pressure of the barrier fluid in the fluid space of the applicator, and
b) a pressure sensor for measuring the pressure of the barrier fluid in the fluid space to enable leakage detection.

17. The system according to claim 3, wherein
a) the valve needles are firmly or frictionally connected to the nozzle-side membrane, so that a displacement of the valve needles leads to a corresponding deflection of the nozzle-side membrane, while a deflection of the nozzle-side membrane leads vice versa to a corresponding deflection of the valve needles, and
b) the coating agent pressure in the nozzle chamber acts on the nozzle-side membrane and the nozzle-side membrane thereby exerts an opening force on the valve needles, the opening force pressing the valve needles in the direction of an open position, so that the actuators must overcome the opening force when the valve needles are displaced into a closed position, and
c) the barrier fluid pressure in the fluid space acts against the coating agent pressure in the nozzle chamber on the nozzle-side membrane and the nozzle-side membrane thereby exerts a closing force on the valve needles, the closing force pressing the valve needle in the direction of the closed position, and
d) the closing force is greater than the opening force.

18. The system according to claim 1, further comprising a compressed air source for introducing a compressed air shock into the nozzle chamber.

19. The system according to claim 1, further comprising a coating agent outlet for returning the non-applied coating agent from the nozzle chamber of the applicator to a coating agent return.

20. The system according to claim 19, further comprising a coating agent valve at the coating agent outlet, the coating agent valve directing the unapplied coating agent from the applicator selectively to a waste container for disposal or to the coating agent source for reuse.

* * * * *